(12) United States Patent
Snodgrass

(10) Patent No.: US 7,843,988 B1
(45) Date of Patent: Nov. 30, 2010

(54) SYSTEM AND METHOD FOR PRE-PROCESSING TRANSMISSION SEQUENCES IN A JAMMED ENVIRONMENT

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1051 days.

(21) Appl. No.: 11/525,319

(22) Filed: Sep. 21, 2006

(51) Int. Cl.
H04B 1/707 (2006.01)

(52) U.S. Cl. .................................................... 375/146

(58) Field of Classification Search ................. 375/140, 375/141, 145, 146, 149
See application file for complete search history.

(56) References Cited

U.S. PATENT DOCUMENTS

| | | | |
|---|---|---|---|
| 6,223,053 B1 * | 4/2001 | Friedmann et al. | 455/552.1 |
| 6,353,900 B1 * | 3/2002 | Sindhushayana et al. | 714/701 |
| 6,614,387 B1 * | 9/2003 | Deadman | 342/70 |
| 2004/0196926 A1 * | 10/2004 | Chien et al. | 375/316 |
| 2005/0036541 A1 * | 2/2005 | McKown | 375/233 |
| 2005/0180312 A1 * | 8/2005 | Walton et al. | 370/208 |
| 2006/0018336 A1 * | 1/2006 | Sutivong et al. | 370/437 |

* cited by examiner

Primary Examiner—Kevin Y Kim
(74) Attorney, Agent, or Firm—Matthew J. Evans; Daniel M. Barbieri

(57) ABSTRACT

A system for pre-processing transmission sequences in a jammed environment. System a transmitter suitable for transmitting the synchronization preamble further comprising a pseudo noise generator suitable for running a non predictable pseudo random algorithm. Pseudo random algorithm is suitable for generating a codeword operable as a pointer indexed into a table of gold sequences. Pointer is suitable for selecting a pseudo random selection of gold sequences from the table of gold sequences. Pseudo random selection of gold sequences forms a synchronization preamble. Gold sequences are concatenated together to form the synchronization preamble. System further comprises a receiver configured to receive the transmitted synchronization preamble further comprising of a decryption key suitable for decrypting received synchronization preamble.

20 Claims, 2 Drawing Sheets

SYSTEM AND METHOD FOR PRE-PROCESSING TRANSMISSION SEQUENCES IN A JAMMED ENVIRONMENT

FIELD OF THE INVENTION

The present invention relates generally to communication systems, and more particularly to a system and method for preprocessing transmission sequences.

BACKGROUND OF THE INVENTION

In secure communications systems, it is often required that a transmitted message synchronization preamble be non-determinable, non-spoofable and non-predictable. This is especially true for transmission security (TRANSEC) communications, the component of communications security (COMSEC) that results from the application of measures designed to protect transmissions from interception and exploitation by means other than cryptanalysis. Goals of TRANSEC include low probability of interception (LPI), low probability of detection (LPD) and anti-jam, or resistance to jamming. These requirements have led to the use of non-optimally orthogonal binary sequences generated by a pseudo random algorithm for synchronization preambles. To make up for the lack of orthogonality, longer lengths of preamble sequences must usually be transmitted to gain the same synchronization confidence and false alarm rate. However, transmitting longer lengths of preamble sequences generally requires increased transmit power and consumes time-bandwidth, producing less efficient resulting waveforms.

In military contexts, this increased transmit power and time-bandwidth consumption is particularly undesirable. For instance, in a battlefield situation, low transmit power is important for minimizing the likelihood of signal detection by hostile parties, thereby preventing the transmitter's position from being compromised. This may be especially true in a situation where a small team of radio-equipped personnel is located within a hostile region and must communicate with a distant device. For any single radio to communicate with the distant device, considerable transmit power is often required, resulting in a significant opportunity for detection by hostile forces. Moreover, the transmit power level required to communicate over significant distances would likely drain the radio's battery more rapidly than desired. As a result, a need exists to minimize RF emissions during preamble synchronization while maintaining robust, secure communication.

Consequently, a system and method for preprocessing transmission sequences in a jammed environment is necessary.

SUMMARY OF THE INVENTION

Accordingly, the various embodiments of the present invention are directed to a system for pre-processing transmission sequences in a jammed environment. System may be comprised of a transmitter further comprising a pseudo noise (PN) generator suitable for running a non predictable pseudo random algorithm. A PN-generator may be suitable for generating a codeword operable as a pointer indexed into a table of sequences. Pointer 104 may point to a pseudo random selection of sequences from the table of sequences. Pseudo random selection of sequences may form a synchronization preamble 108. Pseudo-random selection of sequences may be a selection of gold sequences concatenated together to form the synchronization preamble. System transmitter may be suitable for transmitting the synchronization preamble along with all other data to be transmitted. System may also comprise a receiver configured to receive the transmitted synchronization preamble and data. The receiver may be further comprised of a decryption key suitable for decrypting received synchronization preamble.

In an additional aspect of an embodiment of the present invention, a method for pre-processing sequences in jammed environments is considered. Method may comprise generating a codeword operable as a pointer via a non predictable pseudo random algorithm. Method may index the pointer into a table of sequences and determine the selection of sequences corresponding with the generated pointer. Selection of sequences may be at least two gold sequences that, when concatenated, may be suitable for comprising a synchronization preamble. Method may further comprise selecting a pseudo random selection of sequences suitable for concatenation based on pointer, concatenating the selection of sequences, and forming a synchronization preamble from the selection of sequences in the table. Method may transmit the synchronization preamble to a receiver. Method may further comprise receiving the transmitted synchronization preamble and decrypting the synchronization preamble.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
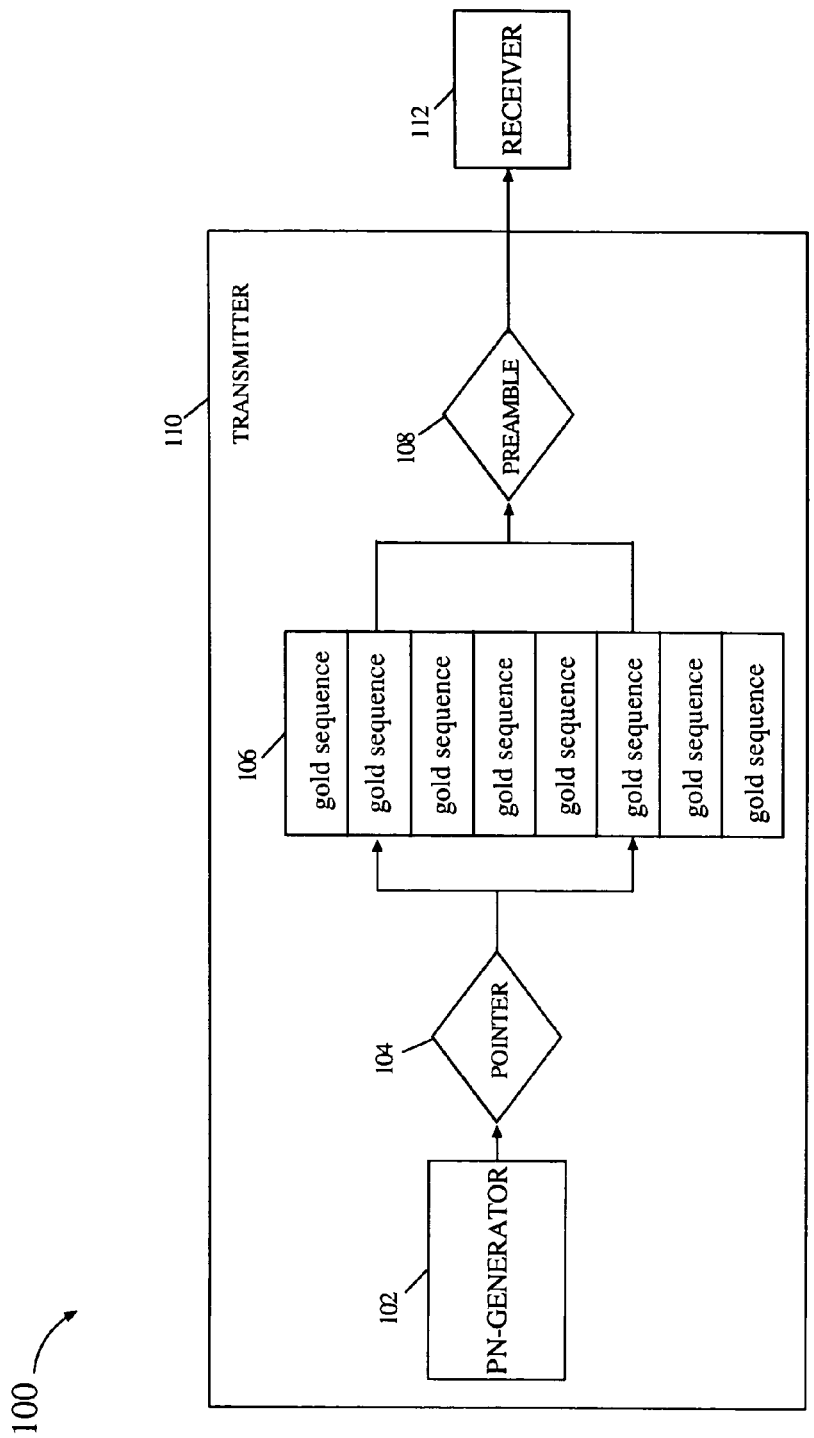
FIG. 1 is a block diagram of a system in accordance with an exemplary embodiment of the present invention.

Referring to FIG. 1, a block diagram of a system 100 in accordance with an exemplary embodiment of the present invention is shown. System 100 may be suitable for any random-access burst structure having a preamble such as a synchronization preamble followed by a data portion. Specifically, system 100 may be configured for operability with any communication system where a synchronization preamble sequence preceding an information message may be utilized to assist rapid synchronization of communication, such as in spread spectrum communication. A preamble sequence may need to be identified rapidly, such as where a time slot is relatively short. This requirement generally suggests the use of short preamble sequences. At the same time, a preamble sequence is preferably resistant to noise, interference and multipath effects, as well as false alarms due to autocorrelation peaks and cross-correlations, so as to ensure the highest probability of proper detection and identification of the preamble sequence at the receiver. However, high processing gain codes typically employ long PN codes and a very large number of chips per data symbol time. The transmitted energy per chip of the high processing gain codes requires that the received signal energy level be accumulated over a large number of data symbol times in order to build up a signal to noise ratio energy level sufficient to detect the PN code before acquiring the code. Thus, acquisition of high processing gain PN codes has heretofore required an inordinate amount of time. The present invention may reduce the long accumulation of energy time by employing a novel preamble comprising at least two short gold sequences concatenated together that may be rapidly acquired. The preamble may also contain random data employed to synchronize the switching of the PN replica code generator from a the short sequence to a high processing gain long code without losing synchronization of the received long sequence which may follow the preamble.

To this end, system 100 may be operable within a secure communications network comprising, at a minimum, at least one transmitter and at least one receiver interconnected by a communications channel. For example, the various embodiments of a system 100 in accordance with the present invention may be operable with code-division-multiple-access (CDMA) based spread-spectrum communications systems.

System 100 may be comprised of a transmitter 110 further comprising a pseudo noise (PN) generator 102 suitable for running a non predictable pseudo random algorithm. PN-generator 102 may be suitable for generating a codeword operable as a pointer 104 indexed into a table of sequences 106. Pointer 104 may point to a pseudo random selection of sequences from the table of sequences. Pseudo random selection of sequences may form a synchronization preamble 108. Pseudo-random selection of sequences may be a selection of gold sequences concatenated together to form the synchronization preamble 106. System transmitter 110 may be suitable for transmitting the synchronization preamble 108 along with all other data to be transmitted. System 100 may also comprise a receiver 112 configured to receive the transmitted synchronization preamble 108 and data. Receiver 112 may be further comprised of a decryption key suitable for decrypting received synchronization preamble.

PN-generator 102 may be suitable for running a non-predictable pseudo-random algorithm. PN-generator 102 may also be suitable for determining a next symbol in a sequence based upon the current state of the algorithm such as an iterating polynomial algorithm. PN-generator 102 may, for example, be a shift register such as a linear feedback shift register (LFSR) with an appropriate feedback polynomial. In addition, the key may be the initial state of the LFSR or may be the initial state plus a description of the feedback polynomial. PN-generator 102 may produce a sequence of bits that appears random. Further, a PN sequence may repeat with period $2^B-1$, where B is the width in bits of the shift register.

In one embodiment of the present invention PN-generator 102 may be suitable for generating a keyed PN-generated codeword. A codeword generated by PN-generator 102 may be operable as a pointer 104 or pointer array indexed into a table of sequences 106. For instance, after PN-generator 102 generates a pseudo random codeword, mapping logic may map the codeword of the keyed PN-generator to an index of gold sequences 106. Logic may include hardware, firmware, software or a combination thereof that performs a certain function on input information. For example, logic may include, but may not be limited or restricted to, a circuit, electronic device, processor (e.g., a digital signal processor, a microprocessor, a microcontroller, an application specific integrated circuit "ASIC" and the like). Information may be voice, data, address, and/or control information. PN-generator 102 may apply pseudo-noise to the coded signals before they are modulated. PN-generator 102 may also superpose on the transmitted signals a pseudo-random sequence characteristic of the area concerned which may limit interference between adjacent areas.

Pointer 104 may be indexed into a table 104 such as a look-up table. For instance, pointer 104 may be suitable for pointing to a selection of sequences stored in the table 106. Pointer 104 may refer to an index entry in a directory of a storage medium such as a disk or memory cache suitable for identifying the space in the storage medium where a piece of electronic data resides. Pointer 104 may prevent the space from being overwritten by other data. Pointer 104 may be an access value, or data stored in a record occurrence that provides the necessary information for locating related record occurrences. In one embodiment, pointer 104 may be a pointer array having pointer elements pointing to different rows of the look-up table 106 comprising the sequences.

In a further additional embodiment of a system 100 in accordance with the present invention, pointer 104 may be operable as a subroutine or subfunction suitable for producing a portion of sequence, such as a synchronization preamble within a larger program. This sequence portion may perform a specific task and may be relatively independent of the remaining sequence or task such as selecting the next sequence in a transmission. Subroutine may be coded to execute a plurality of times or from a plurality of locations during a single execution of the program. Subroutine may also be self executed.

Pointer 104 may be indexed into a substantially large table of sequences 106, such as gold sequences, kasami sequences, or like sequences suitable for providing a large family of orthogonal sequences. In a preferred embodiment, table 106 may be comprised of a selection of gold sequences. The use of gold sequences may also permit the transmission to be asynchronous.

Gold sequences may be stored in a structure, such as a table 106. Table 16 may be provided with an indexing scheme suitable for indexing the gold sequences. Table index may allow the rapid lookup of a key value corresponding to a desired selection of gold sequences and find the location of the corresponding sequences in the table 106. Table 106 may support random access, approximate random access, or the like to enable gold sequence selection location in real time. In contrast with a Boolean transmission of random PN codes, typically a sequence of symbols, namely, "0"s and "1"s, table of gold sequences 106 may be comprised of substantially larger than 2 symbols, and hundreds or more sequences, and may also possess the property of variable length.

Selected gold sequences may be concatenated to form a transmission identification sequence such as a synchronization preamble 108. A synchronization preamble sequence may comprise a relatively easily identifiable sequence that marks the start of the information message and thereby allows a transmitter and a receiver to synchronize. Synchronization preamble 108 may determine a subsequent symbol in a transmitted sequence. The preamble sequence may be spread by an orthogonal code. Transmission identification sequences such as preamble synchronization sequences must generally be orthogonal, as different transmitters may only be identified when orthogonal identification sequences are utilized. Increasing the number of available orthogonal sequences further increases security and protection against a spoofer attempting to ascertain the contents of the transmission based upon the synchronization preamble.

It is contemplated that gold sequences may be concatenated via any concatenation process suitable for concatenating at least two gold sequences. In one embodiment, concatenated preamble sequence 108 may comprise a "square"

sequence. Square sequence may refer to a concatenated preamble sequence generated by taking the product of two smaller base sequences or subsequences of equal length. The two base sequences may be selected for minimal peak aperiodic autocorrelation response properties. Alternatively, concatenated gold sequences of length near elements may be constructed from subsequences of different lengths. For instance, if one of the base sequences is shortened, the other may be lengthened to maintain the same preamble sequence length. Additionally, processing load, measured in terms of "non-zero" taps in the matched filter, may be minimized when constituent sequences are of about equal length, and thus processing load may increase the greater the different in length between the subsequences. For any given number of random bits, PN-generator 102 may yield a more orthogonal overall preamble and eliminate sequences that may be undesired such as long strings of "1"'s or "0"'s, strings of alternating "1"'s and "0"'s, and the like.

In one embodiment, the output of pseudo random number generator and the data may be transmitted to an encryptor. The data may be encrypted with the appropriate key by encryptor and transmitted to a modulator. Modulator may alter the data to RF or laser beam compatible signals and transmit the data to a transmitting antenna system. Transmitter 110 may be capable of transmitting using different modulation schemes, and the modulation scheme is selectable by an interrogator. For example, transmitter 110 may switch between multiple available modulation schemes such as Binary Phase Shift Keying (BPSK), Direct Sequence Spread Spectrum, On-Off Keying (OOK), and Modulated Backscatter (MBS).

System transmitter 110 may transmit the synchronization preamble and data to the appropriate receiver 112. Thereafter, the information contained within the communications signal may be synchronized and recovered by the receiver 112. For instance, the receiver 112 may synchronize the transmission using the auto-correlation property of the gold sequences. The receiver 112 may be suitable for detecting a signal and determining signal content. The receiver 112 may perform demodulation and synchronization, and may further comprise a second pseudo-noise generator applying the sequence that is the inverse of that applied by the pseudo noise generator 102 and a decoder suitable for receiving at an input the same coding rate information as is applied to the input of the coder. When the data to be recovered is modulated on to a carrier and further modulated or spread by a spread spectrum PN code, it may be necessary to generate a replica PN code at the receiver 112 which may be synchronized to the PN code generated at the transmitter to facilitate acquisition and recovery of data. Thus, a receiver 112 may comprise an individual preamble-matched filter configured to receive transmissions from a particular transmitting node. When a preamble sequence is received, the preamble sequence may be detected by the appropriate preamble-matched filter. After detecting a matching preamble sequence, sufficient receiver timing may be acquired to remove the random TRANSEC sequence. At this point, a code correlator such as a CDMA code correlator may de-spread the signal by removing the orthogonal CDMA spreading codes, and the transmitted data may be obtained. It is further contemplated that a receiver 112 may simultaneously synchronize with a plurality of transmitters. For example, in one embodiment, a receiver 112 may include a programmable preamble-matched filter, a transec decoder, and a code division multiple access (CDMA) code correlator configured for an individual transmitter from which a receiver may expect to receive a transmission. An individual preamble-matched filter may be programmed with an identical preamble sequence utilized by the intended transmitter. For TRANSEC applications, once data is processed at the distribution server, data may be transmitted to the TRANSEC server. The transmission encryption layer may be utilized to ensure that content is received by intended recipients only.

Synchronization preamble 108 may be deterministic only if the receiver 112 utilizes decryption such as a crypto key operable to initialize the algorithm. A receiver 112 with the proper key may derive the transmitted synchronization preamble 108. However, a hostile jammer is denied the ability to spoof the transmission. A receiver 112 may be suitable for locating the correct preamble sequence corresponding to the desired transmission. Subsequent to locating the synchronization preamble 108, receiver 112 may determine when to accept the remaining information message and what timing adjustments may need to be made for optimum correlation of the information message. For instance, only a receiver 112 with proper access, such as a proper key, may be authorized to receive and may be able to decrypt the transmitted synchronization preamble 108. In one embodiment, synchronization preamble 108 may be transmitted periodically from the transmitter 110 to the receiver 112 at least until the receiver 112 has been synchronized. A receiver 112 may attempt to detect the synchronization preamble 108 by comparing samples from the received signal to a reference set of synchronization preambles. If a synchronization preamble 108 is detected at an expected interval, a receiving device may synchronize itself based on the occurrence of the preamble.

Figure 2:
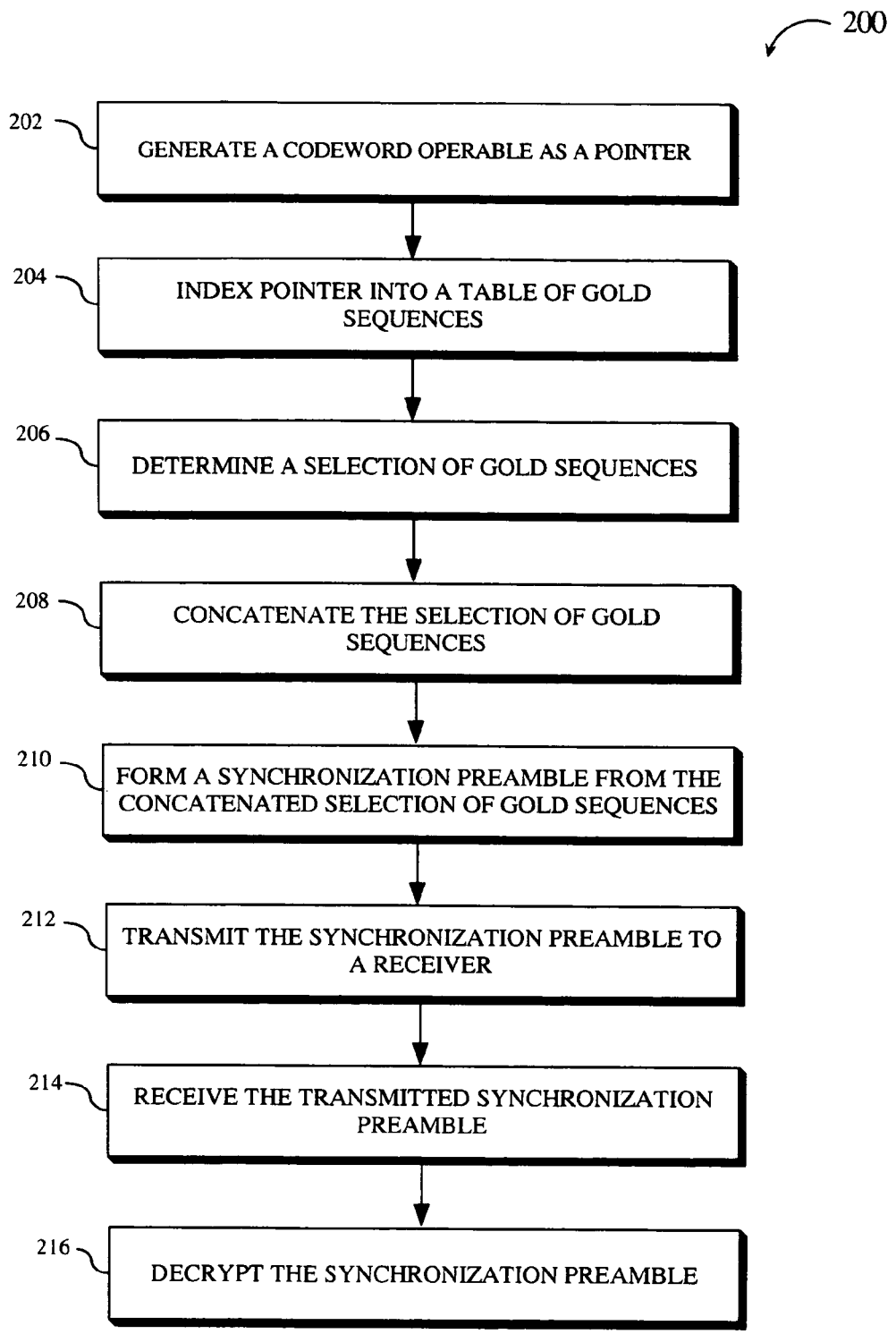
FIG. 2 is a flow diagram of a method in accordance with an exemplary embodiment of the present invention.

Referring to FIG. 2, a flow diagram of a method in accordance with an exemplary embodiment of the present invention is shown. Method 200 may be suitable for transmitting preamble sequences of any desired length. Method 200 may be particularly suitable for preamble sequences having a length of less than 100 bits. Method 200 may comprise generating a codeword operable as a pointer 202 via a non predictable pseudo random algorithm. Method 200 may index the pointer into a table of sequences 204 and determine the selection of sequences 206 corresponding with the generated pointer. Selection of sequences may be at least two gold sequences that, when concatenated, may be suitable for comprising a synchronization preamble. Method 200 may further comprise concatenating the selection of sequences 208 and forming a synchronization preamble from the concatenated selection of sequences in the table 210. Method 200 may transmit the synchronization preamble to a receiver 212. Method 200 may further comprise receiving the transmitted synchronization preamble 214 and decrypting the synchronization preamble 216.

It is contemplated that method 200 may be suitable for communication over a communication link external to an embedded system. The communication link may be capable of connecting a receiver and transmitter in secured communications, such as in a TRANSEC environment. For example, communication link may be via spread spectrum, or like transmission whereby information is carried encoded into discrete packages of information and spread over a wide bandwidth for transmission to specific receivers which filter out the coded material.

It is to be understood that the various embodiments of the present invention would probably be implemented in programmable digital hardware for high throughput applications although they are also conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed that the various embodiments of the present invention and many of their attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed:

1. A system comprising:
 a transmitter suitable for transmitting a synchronization preamble, said transmitter further comprising:
 a pseudo noise generator suitable for running a non predictable pseudo random algorithm, said pseudo random algorithm being suitable for generating a codeword operable as a pointer indexed into a table comprising a plurality of gold sequences,
 wherein said pointer is suitable for selecting a pseudo random selection of at least two individual gold sequences from said plurality of gold sequences to form said synchronization preamble,
 wherein said pseudo random selection of at least two individual gold sequences are concatenated together to form said synchronization preamble, said synchronization preamble comprises a square sequence.

2. The system of claim 1, wherein said at least two gold sequences are of a variable length.

3. The system of claim 1, wherein said at least two gold sequences are of a fixed length.

4. The system of claim 1, further comprising a receiver configured to receive said synchronization preamble from said transmitter, said receiver further comprising a decryption key suitable for decrypting said synchronization preamble.

5. The system of claim 4, wherein said synchronization preamble can be modulated by a sequence known only to said receiver.

6. A system comprising:
 a transmitter suitable for transmitting a synchronization preamble, said transmitter further comprising a pseudo noise generator suitable for selecting a codeword via a non-predictable pseudo-random algorithm, said codeword being operable as a pointer indexed into a table comprising a plurality of individual gold sequences and said pointer being suitable for pointing to a selection of individual gold sequences concatenated together forming said synchronization preamble, said synchronization preamble comprises a square sequence; and
 a receiver suitable for receiving said synchronization preamble transmitted from said transmitter, said receiver further comprising a decryption key suitable for decrypting said synchronization preamble.

7. The system of claim 6, wherein said pseudo random selection of individual gold sequences comprises at least two gold sequences.

8. The system of claim 7, wherein said at least two gold sequences comprising said pseudo random selection of individual gold sequences are concatenated together to form said synchronization preamble.

9. The system of claim 8, wherein said at least two gold sequences are of a variable length.

10. The system of claim 8, wherein said at least two gold sequences are of a fixed length.

11. The system of claim 6, wherein said receiver further comprises a second pseudo-noise generator suitable for applying a sequence to said synchronization preamble that is the inverse of a sequence applied by said pseudo noise generator.

12. The system of claim 6, wherein said synchronization preamble can be modulated by a sequence known only to a participating receiver.

13. A method comprising:
 generating a codeword operable as a pointer via a non predictable pseudo random algorithm;
 indexing said pointer into a table comprising a plurality of gold sequences;
 determining a selection of gold sequences corresponding with said pointer;
 concatenating said selection of gold sequences, to form a synchronization preamble from the concatenated selection of sequences, said synchronization preamble comprises a square sequence; and
 transmitting said synchronization preamble to a receiver, wherein said receiver is suitable for receiving said synchronization preamble and decrypting said synchronization preamble.

14. The method of claim 13, wherein said selection of gold sequences comprises at least two individual gold sequences.

15. The method of claim 14, wherein said at least two individual gold sequences are of a variable length.

16. The method of claim 14, wherein said at least two individual gold sequences are of a fixed length.

17. The method of claim 13, wherein said decrypting said synchronization preamble comprises comparing samples of said synchronization preamble from a received signal to a reference set of synchronization preambles.

18. The method of claim 13, wherein said synchronization preamble can be modulated by a sequence known only to said receiver.

19. The system of claim 4, wherein said decryption key comprises at least one of: an initial state of said pseudo noise generator or a description of a feedback polynomial of said pseudo noise generator.

20. The system of claim 1, wherein said square sequence is formed as a product of the at least two individual gold sequences.

* * * * *